United States Patent
Oates et al.

[11] Patent Number: 5,837,052
[45] Date of Patent: Nov. 17, 1998

[54] PROCESS FOR PRODUCING CEMENT CLINKER CONTAINING COAL ASH

[75] Inventors: David Bridson Oates, Kettleby, Canada; Horace Hershel Compton, Independence, Kans.; Syed Suhail Akhtar, Montreal, Canada

[73] Assignee: Lafarge Canada Inc., Canada

[21] Appl. No.: 833,927

[22] Filed: Apr. 10, 1997

[51] Int. Cl.$^6$ .............................. C04B 7/12; C04B 7/47; C04B 7/48; C04B 7/13
[52] U.S. Cl. .................... 106/705; 106/739; 106/745; 106/750; 106/763; 106/709; 106/DIG. 1; 264/DIG. 49
[58] Field of Search ...................... 106/708, 709, 106/739, 748, 750, 763, DIG. 1, 705, 745; 264/DIG. 49

[56] References Cited

U.S. PATENT DOCUMENTS

| | | | |
|---|---|---|---|
| 3,961,973 | 6/1976 | Jones | 106/709 |
| 4,081,285 | 3/1978 | Pennell | 106/740 |
| 4,121,945 | 10/1978 | Hurst et al. | 106/DIG. 1 |
| 4,265,671 | 5/1981 | Kroyer | 106/763 |
| 5,449,404 | 9/1995 | Folsberg | 106/748 |
| 5,482,528 | 1/1996 | Angell et al. | 106/708 |
| 5,650,005 | 7/1997 | Kistler | 106/750 |

OTHER PUBLICATIONS

Proceedings: Tenth International Ash Use Symposium, vol. 2: Ash Use R&D and Clean Coal By–Products, Beneficiation of Fly Ash by Carbon Burnout, Cochran and Boyd, pp. 73–1 to 73–9 Jan. 1993.

ASTM C–595–94a, Standard Specification for Blended Hydraulic Cements, pp. 288–293 (Date unknown).

ASTM–C–1157M–95, Standard Performance Specification for Blended Hydraulic Cement, pp. 471–475. (Date unknown).

*Primary Examiner*—Michael Marcheschi
*Attorney, Agent, or Firm*—Bachman & LaPointe, P.C.

[57] ABSTRACT

Contaminated coal ash, for example flyash contaminated with carbon is introduced to hot clinker in a cooler downstream of a cement kiln; the carbon is combusted in the cooler to provide a cement clinker having an effective content of flyash free of carbon; this permits use of flyash contaminated with carbon without the need for separate special steps for carbon removal; volatile contaminants or contaminants having a volatile component, for example adsorbed ammonia are similarly removed in the cooler by volatilization.

20 Claims, 1 Drawing Sheet

1

PROCESS FOR PRODUCING CEMENT CLINKER CONTAINING COAL ASH

BACKGROUND OF THE INVENTION i) Field of the Invention

This invention relates to a process for producing a cement clinker having an effective content of pozzolanic coal ash; more especially the invention is concerned with a process in which a contaminated pozzolanic flyash having a contaminant deleterious to cement is the source of the pozzolanic coal ash content of the cement clinker.

ii) Description of Prior Art

In a cement plant, cement clinker is created at elevated temperatures in a cement kiln from cement clinker raw ingredients which travel through the kiln from a feed end to a discharge end, while passing through different processing zones at elevated temperature.

The resulting hot cement clinker which typically has a temperature of about 1300° C. at the discharge end of the kiln, is fed into a cooler and travels as a bed of clinker from the cooler entry port to the cooler exit port on a cooler grate. Air is blown through the bed from jets disposed below the grate to cool the hot clinker. The clinker at the cooler entry port has a temperature of about 1300° C. and the clinker at the cooler exit port has a temperature of about 120° C.

The cooled cement clinker is ground to a desired fineness and may be employed as such in cement or may be admixed with fine particulate pozzolanic flyash to produce a Type IP-Portland pozzolan cement or a Type I(PM) pozzolan-modified Portland cement according to ASTM C595-94a (Standard Specification for Blended Hydraulic Cements); or a blended hydraulic cement according to ASTM C 1157M-95 (Standard Performance Specification for Blended Hydraulic Cement).

Pozzolanic flyash is a finely divided residue from the combustion of ground or powdered coal in coal burning power plants, as Class F or Class C defined in ASTM C618-94a (Standard Specification for Coal Fly Ash . . . for use as a Mineral Admixture in Portland Cement Concrete).

Since about 1986, the emphasis on controlling emission gases from power plants has resulted in the installation of low $NO_x$ burners as a means of reducing oxides of nitrogen in emission gases. The impact of these controls has been an increase in carbon content of Type F and to a lesser extent Type C pozzolanic flyash. Furthermore the addition of low levels of petroleum coke to lignite, bituminous and sub-bituminous coal has also increased the level of carbon in Type C flyash.

Carbon is a detrimental contaminant in cement, having the effect of absorbing chemicals with resulting deterioration of concrete performance.

Prior attempts to remove the carbon from the flyash involve electrostatic separation; mixing the flyash with a fluid such as kerosene and separating the carbon out by foaming; and mixing the flyash with limestone in a fluid bed combustion chamber for combustion of the carbon.

Flyash may also be contaminated with ammonia which coats the flyash particles during flyash recovery by precipitators. The ammonia is strongly adsorbed on the flyash particles and may chemically react to form ammonium salts. Ammonia is deleterious to cement performance, and thus it is also desirable to remove adsorbed ammonia from flyash particles.

The flyash is recovered from the exhaust gases of the coal burning plants, as described hereinbefore, and bottom ash is recovered from the bottom of the boiler as a granular coal ash.

It has recently been determined that ground bottom ash also has pozzolanic activity (U.S. Ser. No. 08/531,792, filed Sep. 21, 1995, D. B. Oates et al). In view of this newly recognized pozzolanic activity of ground bottom ash, it is also appropriate to remove contaminants such as carbon from such ground bottom ash, to render it more suitable for use as partial replacement for cement.

SUMMARY OF THE INVENTION

It is an object of this invention to prepare a contaminated pozzolanic coal ash, for use in cement manufacture, without the need to employ a separate pretreatment to remove the contaminant before addition to the cement clinker.

It is a particular object of this invention to prepare a pozzolanic flyash contaminated with carbon, for use in cement manufacture, without the need to employ a separate pretreatment to remove the carbon before addition to the cement clinker.

It is a further object of this invention to provide a process for producing a cement clinker having an effective content of pozzolanic coal ash, especially flyash.

In accordance with the invention there is provided a process for producing a cement clinker having an effective content of pozzolanic coal ash comprising (a) producing cement clinker, at an elevated temperature, from cement clinker raw ingredients in a cement kiln, (b) feeding hot cement clinker from step (a) into a cooler, (c) feeding a pozzolanic coal ash having a content of a contaminant into contact with said hot cement clinker at an elevated temperature in said cooler and liberating said coal ash of said contaminant at said elevated temperature in the presence of the hot cement clinker in said cooler, and (d) recovering a cooled cement clinker containing said flyash free of said contaminant.

DESCRIPTION OF PREFERRED EMBODIMENTS i) Coal Ash

The coal ash as employed in this invention refers to the residue produced in coal burning furnaces from burning pulverized anthracite or lignite, or bituminous or sub-bituminous coal. Such coal ash includes flyash which is the finely divided coal ash carried from the furnace by exhaust or flue gases; and bottom ash which collects at the base of the furnace as agglomerates.

The pozzolanic flyash employed in the invention may be a Type F or Type C flyash contaminated with carbon or bottom ash similarly contaminated with carbon, such as results from the employment of low $NO_x$ burners to reduce oxides of nitrogen in coal burning power plants, or from uneven firing of coal fired burners generally; or from the addition of low levels of petroleum coke to lignite and sub-bituminous and bituminous coal.

The Type F and Type C flyashes referred to above are defined by CSA Standard A23.5 and ASTM C618, both incorporated herein by reference.

The flyash may contain 1 to 30% more usually 1 to 15%, and typically 1 to 10% by weight, of carbon, an amount which would be disadvantageous if the flyash were employed in an amount of 2 to 40%, or more usually 5 to 25%, by weight, as an addition to cement clinker.

In general it is preferred to avoid the presence of carbon in fly ash which is to replace a portion of cement; when carbon is present it is more difficult to control the characteristics of the cement.

Typically a majority of the flyash, at least about 80%, by weight, comprises particles of less than 45 microns.

The coal ash may also be a pozzolanic flyash or bottom ash contaminated with ammonia which may be in the form of an ammonium compound, for example ammonium salts such as ammonium sulphate.

In general the invention is applicable to any heat-removable contaminant in the coal ash, including contaminants such as carbon which is heat combustible or oxidizible to gaseous products; adsorbed gases such as ammonia which are driven off by heat, and thermally decomposable ammonium compounds such as ammonium salts.

Bottom ash typically is recovered from the base of the furnace as granules of which 80%, by weight, have a size in the range of 100 microns to 8 cm. The bottom ash is ground to fine particle form in which it is found to be pozzolanic before being added to the cement clinker in the cooler.

The process is described hereinafter by reference to the embodiment in which the coal ash is pozzolanic flyash contaminated with carbon, but the invention applies similarly to bottom ash.

ii) Process

The flyash containing carbon is added to a travelling bed of hot cement clinker in the cooler, downstream of the cement kiln, at this stage the cement clinker is granular, typically composed of particles ranging up to 10 to 12 inches. The hot cement clinker travels along a path from the upstream end to the downstream end of the cooler.

The bed of cement clinker is typically 6 to 24 inches thick, travels at a velocity which varies depending on the cooler dimensions and the throughput of the kiln; typically the velocity is about 2 to 6 ft./min., and has a temperature which ranges from about 1300° C. at the entry port to the cooler, immediately downstream of the cement kiln, to 100°–150° C., typically about 120° C. at the clinker discharge port of the cooler.

Generally, the clinker has a residence time of 15 to 60, more usually 20 to 40, and typically about 30 minutes in the cooler. The clinker in the clinker bed varies in size and may include agglomerates as large as 10 to 12 inches.

Jets of cooling air are directed through the travelling clinker bed, typically from below the bed. The large volume of cooling air fed into the cooler typically has two outflow paths from the cooler, one in a generally upstream direction from the cooler into the cement kiln where it provides secondary air for the thermal processes taking place in the cement kiln; and the other in a generally downstream direction and exiting through dust collectors at the downstream end of the cooler.

The hot clinker is thus exposed to cooling air in the path of travel of the bed so that the clinker is progressively cooled from about 1300° C. to about 150° C. as it travels from the upstream end to the downstream end.

The flyash is suitably introduced to the travelling bed of cement clinker so that all or a majority of the flyash travels with the cement clinker towards the exit port of the cooler, and is not entrained by cooling air travelling to the cement kiln. In addition the flyash is introduced to the travelling bed of clinker at a point such that the flyash has an adequate residence time in the cooler, at a sufficiently high temperature for combustion of the carbon content of the flyash.

The point of introduction of the flyash may vary depending on different factors including:

i) the physical state of the flyash;
ii) the carbon content;
iii) the physical state of the carbon;
iv) site of introduction on or within the bed of clinker;
v) the cooler configuration.

If the flyash is introduced at the upstream end of the cooler, in a dry state onto the surface of the bed, a portion of the flyash may be entrained by the air flowing from the cooler into the kiln. In this case the carbon will be burnt off in the kiln, but the flyash will not maintain its discrete integrity, instead it could be chemically incorporated into the clinker, altering the chemical composition and characteristics of the clinker.

On the other hand if the point of introduction of the flyash is moved further downstream in the cooler, or if the flyash is introduced into the interior of the clinker bed, there is less tendency for the flyash to be entrained by the air flowing upstream of the cooler.

Introducing the flyash in a non-air entrainable state, for example in a water damp or moistened state, is another means of minimizing loss of the flyash into the cement kiln. In this case the damp or moistened flyash is subjected to drying and combustion of the carbon as it travels with the clinker bed, and the flyash is either entrapped in pockets between adjacent clinker particles or has travelled sufficiently downstream in the cooler that it is not entrained by the air flowing upstream in the cooler.

If the carbon content is low or if the carbon is already in a partially oxidized state, less heat or a lower residence time is necessary for combustion of the carbon content, so that introduction at a downstream portion of the cooler, where the temperature is lower, may suffice.

In particular the flyash is introduced to the clinker, in the cooler, such that the flyash is conveyed with the clinker towards the cooler exit port, and the flyash is exposed to a temperature and residence time effective for combustion of the carbon while maintaining the integrity of the flyash as a pozzolanic entity which maintains its identity while being associated with the clinker. As the clinker reaches the exit port of the cooler, the flyash may be present as a top layer penetrating the upper zone of the clinker bed or may be admixed with the clinker as a result of movement or agitation of clinker particles during travel through the cooler, or as a result of the initial delivery of the flyash to the interior of the bed.

Generally it is preferred to introduce the flyash to the clinker at a region of the cooler having a temperature of at least 500° to 900° C., preferably at least 700°–750° C., to ensure adequate exposure of the flyash to heat and residence time sufficient for combustion of the carbon content; but for the reasons indicated above considerable variation is permissible in individual cases.

Various delivery means may be employed for introducing the flyash to the clinker, and the design and location of suitable delivery means in the cooler is well within the skill of persons in the art. For example a damp or moistened flyash may be introduced by a reclaim screw auger, the flyash could also be pneumatically delivered to the clinker bed and, for example might be pneumatically injected into the interior of the clinker bed for enhanced commingling with the hot clinker. Introduction into the interior of the bed also minimizes possible loss of the flyash by entrainment in air flowing upstream of the cooler, into the kiln.

Flyash is commercially available and normally employed in a dry state, in which it is a fine powder. It was thus not to be expected that one could successfully introduce flyash into the cooler, especially into a high temperature upstream end of the cooler, and retain it with the clinker in the cooler. One would have expected significant loss of the fine powder by entrainment in air flowing from the cooler into the kiln.

The flyash is suitably introduced to the clinker in the cooler in an amount to provide a content of flyash in the clinker of about 15 to 40%, by weight, based on the combined weight of the flyash and the clinker, where a Portland-pozzolan cement satisfying ASTM C 959-94a is desired; or an amount of 1% to less than 15%, by weight, based on the combined weight of the flyash and the clinker, where a pozzolan-modified Portland cement is desired satisfying ASTM C 595-94a.

In cases where other contaminants are involved, for example flyash contaminated with ammonia or ammonium compound, similar procedures are followed, with the flyash being added at a point or in a form to the clinker, in the cooler, such that the flyash has an adequate residence time at a temperature effective to remove the ammonia or decompose the ammonium compound with liberation of the ammonia gas.

iii) Cement

The cement clinker and coal ash, for example flyash, free of carbon or other contaminants such as ammonia, recovered from the cooler is ground to a desired fineness of the cement clinker. Employing the process of the invention the flyash is thus interground with the cement clinker achieving a homogeneous mixing and distribution of the flyash throughout the cement, in the normal grinding operation to which the clinker is subjected.

The cement clinker may also be mixed with other components for example blast furnace slag or limestone. In this case the cement clinker with the flyash component may be interground with the blast furnace slag or limestone, or the cement clinker with the flyash component, and the blast furnace slag or limestone may be ground separately, and be subsequently mixed together.

Furthermore the clinker or clean flyash from other sources may be admixed with the resulting cement clinker to adjust the physical characteristics to specific or desired characteristics.

DESCRIPTION OF PREFERRED EMBODIMENTS WITH REFERENCE TO THE DRAWINGS

Figure 1:
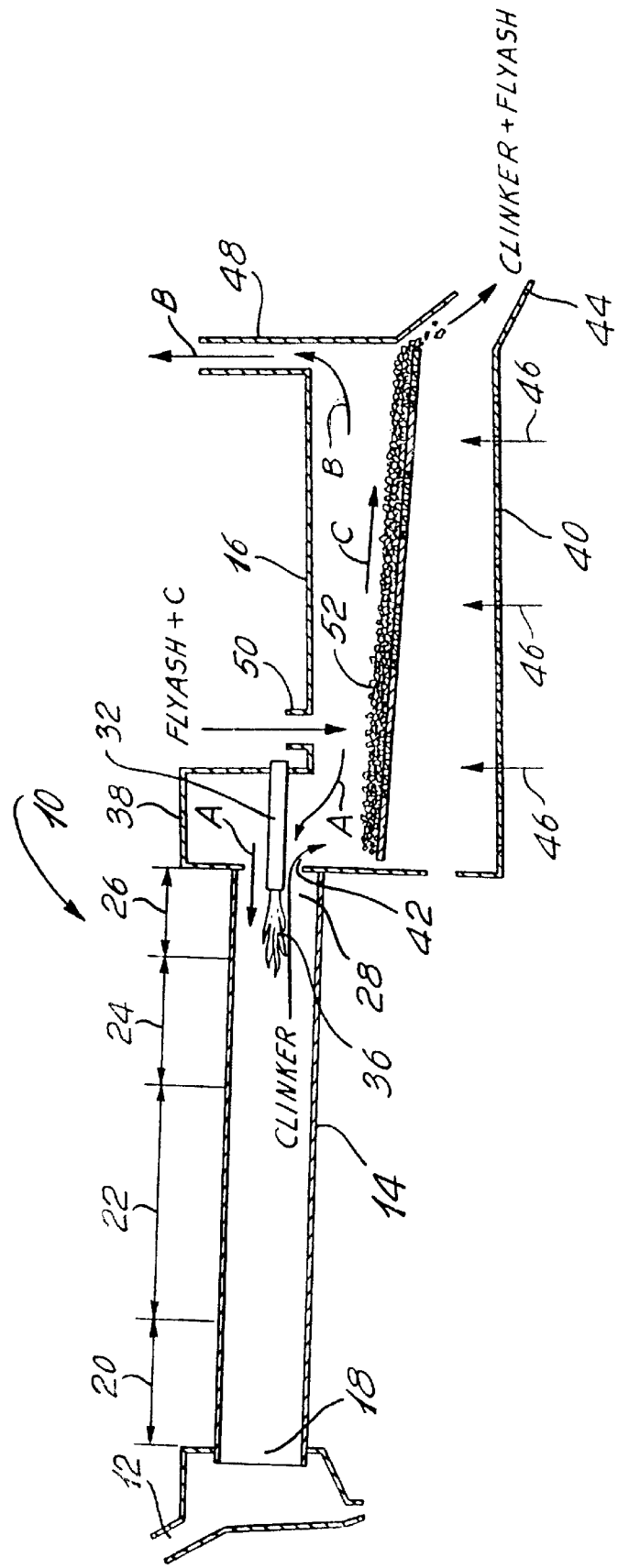
FIG. 1 is a schematic illustration of a kiln assembly including a kiln and a cooler.

With further reference to FIG. 1, a kiln assembly 10 includes a feed inlet 12, a rotary kiln 14 and a cooler 16.

The kiln 14 is mounted for rotation relative to feed inlet 12 and cooler 16.

Rotary kiln 14 has a drying zone 20 for use in a wet process, a calcining zone 22, a burning zone 24 and an initial cooling zone 26.

Rotary kiln 14 extends between a feed port 18 and a clinker outlet 28.

A burner assembly mounted externally of kiln 14 has a burner nozzle 32 mounted in a firing hood 38 which nozzle 32 extends through outlet 28 into kiln 14. A flame 36 is developed at nozzle 32.

Cooler 16 has an entry port 42 which communicates with clinker outlet 28 of kiln 14, and an exit port 44. A cooler grate 40 is mounted in cooler 16 and air jets 46 disposed below cooler grate 40 feed jets of cooling air upwardly through cooler grate 40 and a bed 52 of clinker supported on cooler grate 40.

Cooler 16 has an air discharge 48 and a feed port 50 for introducing flyash contaminated with carbon.

Cooler grate 40 comprises a plurality of plates in side-by-side relationship. Some of the plates have openings therethrough to allow passage of the cooling air. Some plates are fixed and other are mounted to oscillate, back and forth. The movement of the oscillating plates agitates the clinker, and with it the flyash.

The cooler grate 40 is inclined downwardly from the entry port 42 to exit port 44. The bed 52 of clinker is advanced towards exit port 44 by the oscillation of some of the plates, in conjunction with the inclination and the build-up of clinker introduced into cooler 16 from kiln 14.

In operation raw cement clinker ingredients in particulate form are fed through inlet 12 and feed port 18 into kiln 14, where they first enter drying zone 20. The kiln 14 rotates slowly, and is inclined downwardly from port 18 to outlet 28. With the rotation of kiln 14, the ingredients advance slowly and sequentially through drying zone 20, calcining zone 22 and burning zone 24, into which a flame extends from burner nozzle 32.

In drying zone 20 the temperature typically ranges from 300° C. to 800° C. In calcining zone 22 the temperature typically ranges from 825° C. to 1000° C. and in burning zone 24 the temperature is typically 1400° C. to 1425° C.

Clinker formation is completed in burning zone 24.

The kiln 14 operates in conventional manner and the present invention is not concerned with the operation of kiln 14. Hot clinker produced in kiln 14 is discharged through clinker outlet 28 and enters cooler 16 at entry port 42 where it falls onto the cooler grate 40 which advances the hot clinker towards exit port 44. The hot clinker falling onto cooler grate 40 forms a bed 52 of clinker particles which typically has a thickness or depth of 6 to 24 inches.

Air is injected under pressure through air jets 46 located below cooler grate 40, the air permeates through plates in the cooler grate 40 and the bed 52, the clinker being progressively cooled by the air from jets 46 as it advances towards exit port 44. The cooler 16 is typically operated under low pressure or partial vacuum and the air permeating upwardly through bed 52 flows either along the path indicated by the arrows A into kiln 14 or along the path indicated by the arrows B exiting from the downstream end of the cooler. The path of travel of the bed 52 is indicated by the arrow C.

Flyash contaminated with carbon is introduced to the clinker through port 50 at an upstream end of cooler 16. Port 50 represents merely one location where the flyash contaminated with carbon may be introduced. The flyash contaminated with carbon could, for example, also be introduced pneumatically from below the bed 52 and so as to penetrate into the bed 52 with entrapment of the flyash within the bed 52.

As the bed 52 with the flyash contaminated with carbon travels towards exit port 44, the carbon content of the flyash is combusted to oxides of carbon. At the downstream end of cooler 16, the cooled clinker and the flyash free of carbon fall from cooler grate 40 through exit port 44 where they pass to further processing such as intergrinding for the manufacture of the cement.

Fine particles of flyash and/or cement clinker entrained in the air exiting discharge 48 along flow path B may be collected and returned to the cooler, for example through port 50.

EXAMPLE i) Trial

In a trial a kiln assembly similar to that schematically illustrated in FIG. 1 was employed. A Type F flyash sample was employed which had been moistened with water. The moistened ash had a water content of 25.1%, by weight, and exhibited a 3.36%, by weight, loss on ignition. If the entire loss on ignition was due to the carbon content, this would correspond to a carbon content in the original flyash, on a dry basis, of 4.62%, by weight.

The moistened flyash was introduced into the cooler 16 with a screw auger, at part 50. The screw auger was a 12 inch diameter screw. The screw auger fed the moistened flyash progressively into the cooler where it dropped from the roof of the cooler 16, which roof was about 8 feet from the top of the plates defining the cooler grate 40. In the trial 3.5 tons of the ash sample were injected into the cooler with the screw auger during a period of one hour. Due to the limited capacity of the screw auger, 3.5 tons represented the maximum flyash that could be injected.

The kiln was operated at a clinker production rate of 28 tons per hour so that the flyash injection was at 12.5% of the clinker.

Clinker samples were collected prior to the trial and periodically during the trial. The samples were collected at three locations, namely the kiln hood, the clinker exit and the cooler exhaust.

The collected clinker samples were analyzed for the loss on ignition to determine any unburned carbon.

The results showed no loss on ignition for the hood or for the clinker exit samples, indicating a complete combustion of carbon in the ash.

In a subsequent set of trials, a lower flyash injection rate was employed, namely 6.5%, by weight, of clinker production, the flyash was injected at such rate for about 6 hours. The objective of these trials was to observe any operational difficulties. Periodic samples were taken at the same location as for the first trial with analysis for loss on ignition. Analysis of the samples also showed complete burn out of the carbon content of the flyash.

We claim:

1. A process for producing a cement clinker having a content of pozzolanic coal ash comprising:
    a) producing hot cement clinker from cement clinker raw ingredients in a cement kiln;
    b) feeding hot cement clinker from step a) into a cooler;
    c) feeding a pozzolanic coal ash, having a content of a contaminant, into contact with said hot cement clinker in said cooler and liberating said contaminant from said coal ash with heat evolved from said hot cement clinker as said hot cement clinker cools in said cooler; and
    d) recovering a cooled cement clinker containing said coal ash free of said contaminant.

2. A process according to claim 1, wherein said contaminant is heat recoverable.

3. A process according to claim 2, wherein said contaminant is adsorbed ammonia or an ammonium salt.

4. A process according to claim 1, wherein said coal ash is bottom ash.

5. A process according to claim 1, wherein said coal ash is flyash.

6. A process for producing a cement clinker having a content of flyash comprising:
    a) producing hot cement clinker from cement clinker raw ingredients in a cement kiln;
    b) feeding hot cement clinker from step a) into a cooler,
    c) feeding a flyash, having a content of carbon, into contact with said hot cement clinker in said cooler and oxidizing said carbon in the presence of the hot cement clinker in said cooler, said flyash being selected from type F flyash or Type C flyash of ASTM C618 and
    d) recovering a cooled cement clinker containing said flyash free of carbon.

7. A process according to claim 6, wherein said flyash has a content of carbon of 1 to 30% by weight.

8. A process according to claim 6, wherein said flyash in step c) is moistened with water.

9. A process according to claim 6, wherein said flyash is fed in step c) in an amount to provide up to 40%, by weight, of flyash based on the weight of clinker and flyash.

10. A process according to claim 9, wherein said hot cement clinker in step c) has a temperature of at least 500° C.

11. A process for producing a cement clinker having a content of pozzolanic flyash comprising:
    i) producing hot cement clinker from cement clinker raw ingredients in a cement kiln,
    ii) feeding hot cement clinker from step a) into a cooler at an upstream end of said cooler,
    iii) feeding said hot cement clinker along a path from said upstream end to a downstream end of said cooler, and exposing said clinker to cooling air in said path such that said clinker is progressively cooled from about 1300° C. to 120° C. as it travels from said upstream end to said downstream end,
    iv) feeding a pozzolanic flyash, contaminated with 1 to 30% by weight of carbon into contact with said clinker in said path such that said flyash contacts said clinker at a temperature of at least 500° C., and maintaining said flyash in contact with said clinker, in said cooler, for a residence time sufficient for combustion of the carbon contamination while maintaining the integrity of the flyash, said pozzolanic flyash being selected from Type F flyash or Type C flyash of ASTM C618 and
    v) recovering a cooled cement clinker containing pozzolanic flyash free of carbon.

12. A process according to claim 11, wherein said flyash in step iv) is fed in an amount to provide up to 40%, by weight, flyash based on the combined weight of clinker and flyash.

13. A process according to claim 11, wherein said flyash in step iv) is contaminated with 1 to 10%, by weight, of said carbon; and said clinker in step iv) has a temperature of at least 700° C.

14. A process according to claim 1 wherein in step c) said coal ash contacts said hot clinker at a temperature of 500° to 900° C.

15. A process according to claim 9 wherein in step c) said hot clinker has a temperature of 500° to 900° C.

16. A process according to claim 15 wherein said temperature is 700° to 750° C.

17. A process according to claim 10 wherein said temperature is 500° to 900° C.

18. A process according to claim 11 wherein in step iv) said temperature is 500° to 900° C.

19. A process according to claim 13 wherein in step iv) said temperature is 700° to 750° C.

20. A process according to claim 6, wherein said flyash is Type F flyash of ASTM C618.

* * * * *